US011447295B2

(12) United States Patent
Vandecruys et al.

(10) Patent No.: US 11,447,295 B2
(45) Date of Patent: Sep. 20, 2022

(54) GLASS CONTAINER HAVING AN INKJET PRINTED IMAGE AND A METHOD FOR THE MANUFACTURING THEREOF

(71) Applicant: Anheuser-Busch InBev S.A., Brussels (BE)

(72) Inventors: Jonas Vandecruys, Leuven (BE); Marin Steenackers, Leuven (BE); Johan Van de Velde, Leuven (BE); Frederik Fernand S. De Graaf, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 421 days.

(21) Appl. No.: 16/098,125

(22) PCT Filed: May 11, 2017

(86) PCT No.: PCT/EP2017/061279
§ 371 (c)(1),
(2) Date: Oct. 31, 2018

(87) PCT Pub. No.: WO2017/194653
PCT Pub. Date: Nov. 16, 2017

(65) Prior Publication Data
US 2019/0152843 A1    May 23, 2019

(30) Foreign Application Priority Data

May 12, 2016 (EP) ..................... 16169470

(51) Int. Cl.
*B65D 23/08* (2006.01)
*B32B 1/02* (2006.01)
*C03C 17/00* (2006.01)
*B41M 5/00* (2006.01)
*C03C 17/38* (2006.01)
*B32B 17/06* (2006.01)
*B65B 3/04* (2006.01)
*B65D 85/72* (2006.01)
*C03C 17/42* (2006.01)
*C03C 25/002* (2018.01)

(52) U.S. Cl.
CPC ............ *B65D 23/0814* (2013.01); *B32B 1/02* (2013.01); *B32B 17/06* (2013.01); *B41M 5/007* (2013.01); *B41M 5/0011* (2013.01); *B41M 5/0047* (2013.01); *B41M 5/0088* (2013.01); *B65B 3/04* (2013.01); *B65D 85/72* (2013.01); *C03C 17/005* (2013.01); *C03C 17/38* (2013.01); *C03C 17/42* (2013.01); *C03C 25/002* (2013.01); *B41M 2205/40* (2013.01); *C03C 2217/72* (2013.01); *Y10T 428/131* (2015.01)

(58) Field of Classification Search
CPC .......... B32B 1/02; B32B 17/06; B41M 5/007; B41M 5/0011; B41M 5/0047; B41M 5/0088; B41M 2205/40; B65D 23/0814; B65D 85/72; C03C 17/005; C03C 17/42; C03C 25/002; C03C 2217/72; Y10T 428/131

See application file for complete search history.

(56) References Cited

U.S. PATENT DOCUMENTS

| | | |
|---|---|---|
| 3,498,819 A | 3/1970 | Lyle et al. |
| 3,952,118 A | 4/1976 | Novice |
| 4,250,068 A | 2/1981 | Ali-Zaidi |
| 4,517,242 A | 5/1985 | Sinha et al. |
| 10,279,599 B2 | 5/2019 | Till |
| 2009/0104387 A1 | 4/2009 | Postupack et al. |
| 2009/0197026 A1 | 8/2009 | Vilato et al. |
| 2011/0143064 A1 | 6/2011 | Da Silva et al. |
| 2011/0250346 A1* | 10/2011 | Remington, Jr. ........ C03C 17/42 427/8 |
| 2013/0157826 A1 | 6/2013 | Preckel et al. |
| 2015/0225285 A1 | 8/2015 | Domey et al. |
| 2016/0221359 A1* | 8/2016 | Till ................. B41J 3/4073 |

FOREIGN PATENT DOCUMENTS

| | | |
|---|---|---|
| CN | 1304339 | 7/2001 |
| CN | 1765636 | 5/2006 |
| CN | 103144442 | 6/2013 |
| DE | 2803719 A1 | 8/1978 |
| DE | 19946080 A1 | 5/2000 |
| DE | 102013215637 A1 | 3/2015 |

(Continued)

OTHER PUBLICATIONS

Thorp, Debbie, "Inkjet Printing—Flat and Container Glass," (Internet citation) www.globalinkjetsystems.com, Nov. 30, 2015.
"Deutsches Patent—und Markenamt, "Registerauszug DE—Marke Pyrosil", [gefunden Jan. 6, 2022]", 2 pages.
Fa. SURA Instruments GmbH, 07743 Jena, Deutschland, "Pyrosil-Verfahren" Jan. 6, 2022, https://sura-instruments.de/technologien/pyrosilr-verfahren, 3 pages.

(Continued)

*Primary Examiner* — Walter Aughenbaugh
(74) *Attorney, Agent, or Firm* — Klintworth & Rozenblat IP LLP

(57) ABSTRACT

A glass container has an outer glass surface with an inkjet printed image provided on the surface. An at least partially water soluble cold-end coating (CEC) with a thickness from 0.002 to 10 micrometers is present between the outer glass surface and the inkjet printed image. The glass container is preferably a one-way beverage bottle. A method of inkjet printing an image on a glass container comprises the steps of (a) manufacturing a glass container having an at least partially water soluble CEC layer with a thickness from 0.002 to 10 micrometers, and (b) inkjet printing an image on the glass container.

19 Claims, No Drawings

(56) References Cited

FOREIGN PATENT DOCUMENTS

| | | |
|---|---|---|
| DE | 102014100385 A1 | 7/2015 |
| EP | 2 591 917 A1 | 5/2013 |
| EP | 2467439 B1 | 6/2014 |
| GB | 1 471 293 | 4/1977 |
| JP | 2015214446 A | 12/2015 |
| JP | 2016041637 A | 3/2016 |
| WO | 1999033906 A1 | 7/1999 |
| WO | 2011127294 A1 | 10/2011 |
| WO | 2013167558 A1 | 11/2013 |
| WO | 2014085246 A1 | 6/2014 |
| WO | WO 2015036588 | 3/2015 |

OTHER PUBLICATIONS

Notice of Opposition to the European Patent No. 3455181 dated Jun. 28, 2022, 76 pages.

* cited by examiner

GLASS CONTAINER HAVING AN INKJET PRINTED IMAGE AND A METHOD FOR THE MANUFACTURING THEREOF

FIELD OF THE INVENTION

The present invention relates to glass containers, in particular glass bottles, decorated with printed images on the glass surface. Further, the present invention relates to a method for manufacturing such glass containers.

BACKGROUND OF THE INVENTION

It is commonly known in the art that beverage bottles bear a lubricious and protective transparent coating, the so-called cold-end coating (CEC), at the outer surface. Such CEC prevents the glass container from being scratched and protects it in abrasive or caustic environment. The CEC, typically a polyethylene wax causes the glass surface to become slippery. The resulting low friction coefficient diminishes the forces in bottle-to-bottle contact in bottling lines and transport. Bottles coated in this way move freely through inspection and filling lines and sustain less surface damage. A damaged surface looks bad to the consumer and weakens the glass, often resulting in premature breakage. In addition, instead of accepting an increase in bursting pressure, the bottle may be made lighter while still retaining its strength.

Nowadays in glass container manufacturing a two-step coating is applied in order to obtain scratch resistance and slipperiness of the glass containers. In the first step, the so called hot-end coating (HEC) is typically applied by means of chemical vapor deposition (CVD) of a metal containing compound on the freshly formed, hot and single or double line positioned glass containers. Such a HEC is based on coating precursor that includes tin, titanium other heat decomposable metallic or organometallic compounds. This application is done inside a so called coating tunnel or coating hood where the HEC is applied by chemical vapor deposition in forming a thin layer of a metal oxide, for example tin oxide. The objective is to coat the outside of the glass container with a homogenous even layer except for the so called finish. Since this is done in vapor phase and on single line conveyed glass containers, a homogeneous distribution can be achieved easily. The thin layer of metal oxide, often tin oxide, is the basis for the second coating, the so called cold-end coating (CEC). After the HEC application, the glass containers are usually submitted through a special type of oven called also annealing lehr. Latter is designed specifically for annealing glass and to cool down the containers in a controlled way. The glass is heated to the annealing point and then slowly cooled down. This process relieves the internal stresses, making the glass much more durable.

In a subsequent process step, images of the logo, ingredients, etc. corresponding the content of the bottle are typically printed on the CEC, e.g. by screen printing.

However, a main problem is that in all industries, in particular packaging industry, printing is continuously moving towards digitization with greater speed, quality, flexibility and efficiency. Unfortunately, screen printing is not a digital printing technique, as for example inkjet printing is. Also offset and flexographic printing systems are being increasingly replaced for printing applications by industrial inkjet printing systems due to their flexibility in use, e.g. variable data printing, and due to their enhanced reliability, allowing their incorporation into production lines.

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes or pigments and polymers. Ink compositions can be roughly divided in: water-based, the drying mechanism involving absorption, penetration and evaporation; solvent-based, the drying primarily involving evaporation; oil-based, the drying involving absorption and penetration; hot melt or phase change, in which the ink is liquid at the ejection temperature but solid at room temperature and wherein drying is replaced by solidification; and energy-curable, in which drying is replaced by polymerization induced by exposing the ink to a radiating or thermal energy source.

The first three types of ink compositions are more suitable for an absorbing receiving medium, whereas hot melt inks and energy-curable inks can also be printed on non-absorbing ink-receivers. Due to thermal requirements posed by hot melt inks on the substrates, especially radiation curable inks have gained the interest of the packaging industry.

However, inkjet printing on glass containers which need a CEC during manufacturing for the reasons mentioned above, such as bottles, has been proven still to be difficult and to result in poor image quality of the prints.

As a result, there remains a need for optimized inkjet printing methods for glass containers which need a CEC, especially in high speed processes such as beverage bottling lines.

SUMMARY OF THE INVENTION

The present invention is directed to a glass container having an outer glass surface with an inkjet printed image provided on said surface, characterized in that an at least partially water soluble CEC with a thickness from 0.002 to 10 micrometer is present between the outer glass surface and the inkjet printed image.

Such glass container is preferably a one-way beverage bottle.

In addition, the present invention is directed to a method of inkjet printing an image on a glass container comprising the steps of:

a) manufacturing a glass container having an at least partially water soluble CEC layer with a thickness from 0.002 to 10 micrometer, b) inkjet printing an image on the glass container.

DETAILED DESCRIPTION OF THE INVENTION

It was unexpectedly found now that by inkjet printing on an at least partially water soluble CEC with a thickness from 0.002 to 10 micrometer, adhesion as well as print quality of the prints, e.g. color aberrations and resolution is significantly improved compared to print quality on a glass substrate with non-water soluble CEC.

Therefore, in a first embodiment, the present invention provides a glass container having an outer glass surface with an inkjet printed image provided on said surface, characterized in that a partially water soluble CEC with a thickness from 0.002 to 10 micrometer is present between the outer glass surface and the inkjet printed image. Preferably, the thickness of the CEC is between 0.005 and 1 micrometer, and even more preferably between 0.005 and 0.5 micrometer. A thickness of 5 nm is equivalent to a one or a few monolayers Further, an embodiment may be provided wherein a so-called hot-end coating (HEC) may be present between the outer glass surface and the CEC.

The HEC typically comprises a metal oxide layer, typically a layer of 5 to 20 nm. More specifically, said metal oxide in the metal oxide layer may be chosen from the group comprising: tin oxide, titanium oxide, zirconium oxide and/or combinations thereof, as described in U.S. Pat. Nos. 3,952,118 and 489,816.

In a particular embodiment in accordance with the present invention, the metal oxide layer of the HEC may be a tin oxide obtained from monobutyltinchloride (MBTC) as a precursor.

In an embodiment of a glass container of the present invention, the CEC may be at least partially water soluble between 20 and 90° C., preferably at 50° C. Besides benefits in the production of inkjet printed glass containers as will be explained further in this text, an at least partially water soluble CEC may be beneficial for recycling one-way glass container waste since it can be removed at least partially by rinsing with water between 20 and 90° C., preferably at 50° C.

In the context of the present invention, the CEC being at least partially water soluble is understood as the CEC being removable at least partially by technical water, tap water, purified water or distilled water such that the bottle's slip angle increases with at least 6° after washing vs. before washing. Slip angles are determined by putting one bottle on top of two horizontal bottles of the same type, in line contact. The tilt angle is increased at a certain speed and the tilt angle on which the top bottle starts to slide off is called the slip angle. A slip angle may have value of more than 30° to less than 10°.

In particular, the at least partially water soluble CEC may be fatty acid based, preferably stearate based. In another particular preferred embodiment, the at least partially water soluble CEC may be polyethylene glycol based.

In another embodiment of a glass container of the present invention, the CEC may be at least partially oxidized by flame, corona, or plasma treatment. It is known in the art that screen printing inks do not adhere well to glass containers having been treated with CEC, and that flame, corona or plasma energy may be applied to the glass containers to achieve better adhesion of an organic coating (e.g. an inkjet ink) thereto.

Further, a glass container according to the present invention may comprise a silicon containing layer, preferably a silica containing layer (eg. pyrosil), between the CEC and the inkjet printed image. Such silicon containing layer provides increased bonding sites for the inkjet printed layer(s). Furthermore, they may result in a rough nanoporous material surface for increased adhesion and a surface with a higher surface energy. It may be deposited for example by flame pyrolysis. Precursors may be delivered as a vapor, an atomized liquid, an atomized solution, and/or the like.

A primer layer may be present between the CEC and the inkjet printed image in order to enhance adhesion of the ink. Such primer may be pigmented, white or transparent and may comprise an adhesion promotor. Such primer may also be oxidized by flame, corona, or plasma treatment to enhance adhesion of the inkjet ink. A white pigmented primer, typically containing e.g. titanium dioxide, is preferably used to enhance the contrast and the vividness of color inks printed on a primed substrate. This is especially effective when the substrate is transparent. In particular, the primer may comprise a radically reactive group moiety such as a thiol group, an amine group, or an ethylenically unsaturated group such as a vinyl ether, a vinyl ester, an acrylamide, a methacrylamide, a styril, or preferably an allyl, an acrylate, or a methacrylate.

The inkjet printed image on a glass container according to the present invention may comprise one or more layers of ink, preferably energy-cured ink, i.e. the ink may be cured in any suitable manner, for example, radiation-cured by any suitable type of radiation like, for instance, ultraviolet, electron beam, or the like, or thermally-cured by convection oven, infrared lamps, or the like, or a combination of both radiation and thermal energy.

On the inkjet printed glass container, a protective layer and/or a clear coating may be applied for protecting the image and/or achieving a more glossy or mat impression (or another optical effect).

The inkjet printed image may have a printing resolution of at least 300 dpi.

After printing, a friction coefficient reduction coating may be applied on the entire glass container.

A glass container in accordance with the present invention may be a glass bottle, preferably a beverage bottle and most preferably a one-way beverage bottle. A returnable glass container which is exposed to caustic rinses after use, would lack HEC after a limited number of returns.

Further, a glass container in accordance with the present invention may be preferably cylindrical bottle.

in an additional aspect of the present invention, an embodiment is provided of a method of inkjet printing an image on a glass container comprising the steps of:

a) manufacturing a glass container having an at least partially water soluble CEC with a thickness from 0.002 to 10 micrometer, b) inkjet printing an image on the glass container.

Preferably, the thickness of the CEC is between 5 nm and 1 micrometer, and even more preferably between 5 nm and 0.5 micrometer.

The at least partially soluble CEC may be a CEC which is soluble in tap water or distilled water at a temperature between 20° C. and 90° C., preferably at 50° C.

Alternatively, in an embodiment in accordance with the present invention, a method of inkjet printing an image on a glass container is provided, wherein a primer layer is applied on the CEC and prior to inkjet printing an image on the glass container. Such primer may be pigmented, white or transparent and may comprise an adhesion promotor. Such primer may also be energy-curable such that the inkjet ink can be jetted onto the wet primer, wherein the inkjet ink has a viscosity that is lower than the primer viscosity, and wherein the primer and the inkjet ink can be simultaneously energy-cured. Such primer may be pigmented, white or transparent and may comprise an adhesion promotor. Such primer may also be oxidized by flame, corona, or plasma treatment to enhance adhesion of the inkjet ink. A white pigmented primer, typically containing e.g. titanium dioxide, is preferably used to enhance the contrast and the vividness of color inks printed on a primed substrate. This is especially effective when the substrate is transparent. In particular, the primer may comprise a radically reactive group moiety such as a thiol group, an amine group, or an ethylenically unsaturated group such as a vinyl ether, a vinyl ester, an acrylamide, a methacrylamide, a styril, or preferably an allyl, an acrylate, or a methacrylate.

The CEC may be at least partially oxidized by flame, corona, or plasma treatment in order to enhance adhesion of the inkjet ink thereto.

In a further embodiment in accordance with the present invention, after the flame, corona, or plasma treatment, a silica based, preferably silicate based, layer may be applied on the at least partially oxidized CEC. Such silica containing layer provides increased bonding sites for the inkjet layer(s). It may be deposited for example by flame pyrolysis. Precursors may be delivered as a vapor, an atomized liquid, an atomized solution, and/or the like.

In a further embodiment in accordance with the present invention, after the flame, corona, or plasma treatment, a silicon based, preferably silica based (e.g. pyrosil) layer may be applied on the glass container. So, this silicon based layer may be applied on at least partially oxidized CEC before inkjet printing the image. Such silicon containing layer provides increased bonding sites for the inkjet layer(s). Furthermore, they may result in a rough nano-porous material surface for increased adhesion and a surface with a higher surface energy. It may be deposited for example by flame pyrolysis. Precursors may be delivered as a vapor, an atomized liquid, an atomized solution, and/or the like.

Preferably, glass containers manufactured according to a method of the present invention are filled after inkjet printing the image thereon in order to avoid damage to the inkjet printer due to accidental bursting of the filled glass container.

In the step of inkjet printing, the inkjet print head may scan back and forth in a longitudinal direction across the moving glass container, and the inkjet print head may not print on the way back. However, bi-directional printing may be used and may be preferred for obtaining a high area throughput on big size glass containers. Another preferred printing method may print also in multiple passes but in a transversal direction (circular around the bottle). In this method, the relative position of the bottle versus the printhead can be changed after every pass in order to print images that are larger than the size of one print head. This necessitates stitching of the print artwork. Another variation on this method uses relative movement of the bottle vs the printhead while printing the different passes: one obtains spiral printing across the bottle. In the latter, stitching defects will be less pronounced. Another preferred printing method may be by a "single pass printing process", which can be performed by using wide inkjet print heads or multiple inkjet print heads which cover the entire width of the image to be printed (staggered or connected to each other). In a single pass printing process the inkjet print heads usually remain stationary and the substrate surface is transported under the inkjet print heads.

Inkjet printing techniques as used in the present invention may be piezoelectric inkjet printing, continuous type and thermal, electrostatic and acoustic drop on demand type.

A preferred jetting temperature is between 10 and 70° C., more preferably between 20 and 60° C., and most preferably between 25 and 45° C.

Non curing solvent or water-based inkjet inks may be used, but preferably energy-curable inkjet ink is used. Radiation curable inkjet ink, can be cured by exposing to actinic radiation and/or by electron beam curing. Preferably the radiation curing is performed by an overall exposure to actinic radiation or by an overall electron beam curing. Thermally curable inkjet ink can be cured by convection oven, infrared lamps, or the like.

The curing means may be arranged in combination with the print head of the inkjet printer, travelling therewith so that the inkjet ink is exposed to curing energy very shortly after been jetted. In such an arrangement it can be difficult to provide a small enough energy source connected to and travelling with the print head. Therefore, a static fixed energy source may be employed, e.g. a source of curing UV-light, connected to the radiation source by means of flexible radiation conductive means such as a fiber optic bundle or an internally reflective flexible tube. Alternatively, the actinic radiation may be supplied from a fixed source to the print head by an arrangement of mirrors including a mirror upon the print head.

The source of radiation arranged not to move with the print head, may also be an elongated radiation source extending transversely across the ink layer(s) to be cured and adjacent the transverse path of the print head so that the subsequent rows of images formed by the print head are passed, stepwise or continually, beneath that radiation source. The radiation source is preferably an ultraviolet radiation source, such as a high or low pressure mercury lamp containing optional sloping elements, a cold cathode tube, a black light, an ultraviolet LED, an ultraviolet laser or a flash light.

Furthermore, it is possible to cure the inkjet printed image using, consecutively or simultaneously, two light sources of differing wavelength or illuminance. For example, the first UV-source can be selected to be rich in UV-A, e.g. a gallium-doped lamp, or a different lamp high in both UV-A and UV-B. The second UV-source can then be rich in UV-C, in particular in the range of 260 nm-200 nm. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Indeed, oxygen can act as a radical scavenger, taking away available radicals from the polymerization reaction. Residual oxygen levels are usually maintained as low as 200 ppm, but are generally in the range of 200 ppm to 1200 ppm.

In the context of the present invention, the image to be inkjet printed may comprise any type of picture, logo, text, graphic art, coding (QR-code, barcode) and the like.

EXAMPLE

Materials and Procedures

Bottle Samples:

Bottles A: Unprinted Victoria 12 oz bottles (amber glass) were purchased from Nueva Fábrica Nacional de Vidrio, S.A. de C.V. (Mexico). These bottle were produced with a partially water soluble CEC based on ARCOSOL M-70 commercially available from ARCO, S.A. de C.V. (Mexico).

Bottles B: Unprinted one-way 33Cl Adriaan brown bottles (amber glass) were purchased from Ardagh. These bottles were produced with a water non-soluble CEC based on RP 40 commercially available from Arkema.

Printing:

Inkjet-printing of the bottles were performed on a "Laboratory Unit" commercially available from CURVINK by (Netherlands) equipped with a flaming lab module and a primer application lab module. Following procedure was followed for printing the bottles:

The bottles were flamed with the flaming lab module using a speed of 250 mm/sec. The bottles were successively coated in the flaming lab module with pyrosil (commercially available from Sura Instruments). A 0.2% pyrosil concentration was used and the pyrosil speed was set at level 15. The bottles were removed from the flaming lab module and cooled down under ambient conditions at room temperature. The bottles were successively coated with the primer application lab module using a alkoxy silane—based primer in a 2-revolution mode. The bottles were dried under ambient conditions during 8 minutes. The bottles were successively placed in the inkjet module and the bottle body was inkjet printed with a UV-curable acrylic-based white ink. The white ink was jetted with a GS12 XAAR 1001 head in a single pass mode using grey scale level 5. A uniform full white design as well as text was printed. The pinning level was set at 1% and was performed with a 8 W LED bar from Hoenle. Finally, the bottles were taken out of the inkjet module and fully cured with a UV-bulb in an 8 rotation mode.

Pasteurization Simulator:

In order to simulate a pasteurization process, the bottles were placed in a water bath. The following temperature program was followed: 10 minutes at 45° C., 20 minutes at 62° C. and 10 minutes at 30° C. The bottles were removed from the water bath and dried in ambient conditions.

Line Simulator:

For each condition, 28 bottles were placed in a line simulator commercially available from Agr International, Inc. This simulates the conditions a bottle undergoes in a packaging line. The following settings were selected: water faucet on; abrader plate+height at EFG-2; speed control at 8 (60 rpm); gate pressure at 40% slippage (36 rpm for bottles). The bottles were placed during 30 minutes in the line simulator and inspected visually for potential damages to the art work.

Results

Bottles A and B were printed according to the above mentioned printing procedure. It was found that the print quality of the prints on Bottles A was better than the print quality of the prints on bottle B. Especially the printed text showed more print defects on Bottle B than on Bottle A. The bottles were successively placed in a pasteurization simulator, line simulator, and visually inspected. It was found that the printed artwork on bottles B showed much more damages than the printed artwork on bottles A.

The invention claimed is:

1. A glass container having an outer glass surface with an inkjet printed image, wherein an at least partially water soluble cold-end coating, CEC, with a thickness from 0.002 to 10 micrometers is present between the outer glass surface and the inkjet printed image,
the glass container comprising a silica containing layer between the CEC and the inkjet printed image, wherein the inkjet printed image is printed onto the silica containing layer.

2. The glass container according to claim 1, wherein a hot-end coating, HEC, is present between the outer glass surface and the CEC or between the outer glass surface and the inkjet printed image.

3. The glass container according to claim 2, herein said HEC layer is a metal oxide layer.

4. The glass container according to claim 3, wherein said metal oxide in the metal oxide layer is chosen from the group comprising: tin oxide, titanium oxide, zirconium oxide and/or combinations thereof.

5. The glass container according to claim 3, wherein said metal oxide is tin oxide obtained from monobutyltinchloride as a precursor.

6. The glass container according to claim 1, wherein said CEC is at least partially water soluble at 50° C.

7. The glass container according to claim 1, wherein said CEC is fatty acid based or polyethylene glycol based.

8. The glass container according to claim 6, wherein said CEC is at least partially oxidized by flame or plasma treatment.

9. The glass container according to claim 1, comprising a primer layer present between the outer glass surface and the inkjet printed image.

10. The glass container according to claim 9, wherein said primer is white or transparent and comprises an adhesion promotor.

11. The glass container according to claim 10, wherein said inkjet printed image comprises one or more layers of energy-cured ink.

12. The glass container according to claim 1, comprising a protective layer and/or a clear coating applied on top of the inkjet printed image.

13. The glass container according to claim 1, the inkjet printed image having a printing resolution of at least 300 dpi.

14. The glass container according to claim 1, wherein the glass container is a glass bottle.

15. A method of inkjet printing an image on glass container comprising the steps of:
(a) manufacturing a glass container having an at least partially water soluble CEC layer with a thickness from 000.2 to 10 micrometers,
(b) a flame or plasma treatment of the CEC;
(c) applying a silica layer on the glass container after the flame or plasma treatment; and
(d) inkjet printing an image on the silica layer of the glass container.

16. The method according to claim 15, comprising the step of applying a primer layer on the glass container prior to inkjet printing an image on the glass container.

17. The method according to claim 16, further comprising the step of a flame or plasma treatment of the primer layer prior to inkjet printing an image on the glass container.

18. The method according to claim 15 comprising the step of applying a protective layer and/or clear coating on top of the inkjet printed image.

19. The method according to claim 15, comprising the steps of filling the container with a liquid after inkjet printing the image thereon.

* * * * *

UNITED STATES PATENT AND TRADEMARK OFFICE
CERTIFICATE OF CORRECTION

| | |
|---|---|
| PATENT NO. | : 11,447,295 B2 |
| APPLICATION NO. | : 16/098125 |
| DATED | : September 20, 2022 |
| INVENTOR(S) | : Vandecruys et al. |

It is certified that error appears in the above-identified patent and that said Letters Patent is hereby corrected as shown below:

In the Claims

In Column 8, Claim 15, Line 40, delete "000.2" and insert -- 0.002 --, therefor

Signed and Sealed this
Seventh Day of February, 2023

Katherine Kelly Vidal
*Director of the United States Patent and Trademark Office*